(12) United States Patent
Weber

(10) Patent No.: US 8,529,321 B2
(45) Date of Patent: Sep. 10, 2013

(54) FAT COVER MEASUREMENT DEVICE

(75) Inventor: Guenther Weber, Gross Nemerow (DE)

(73) Assignee: Weber Maschinenbau GmbH, Breidenbach (DE)

( * ) Notice: Subject to any disclaimer, the term of this patent is extended or adjusted under 35 U.S.C. 154(b) by 532 days.

(21) Appl. No.: 12/738,969

(22) PCT Filed: Sep. 12, 2008

(86) PCT No.: PCT/EP2008/007567
§ 371 (c)(1),
(2), (4) Date: Jun. 30, 2010

(87) PCT Pub. No.: WO2009/052905
PCT Pub. Date: Apr. 30, 2009

(65) Prior Publication Data
US 2010/0267320 A1 Oct. 21, 2010

(30) Foreign Application Priority Data
Oct. 24, 2007 (DE) .......................... 10 2007 050 857

(51) Int. Cl.
*A22C 17/16* (2006.01)
(52) U.S. Cl.
USPC ........................................................ 452/134
(58) Field of Classification Search
USPC .................. 452/125, 134, 149, 150, 156, 157
See application file for complete search history.

(56) References Cited

U.S. PATENT DOCUMENTS

| | | | |
|---|---|---|---|
| 5,937,080 A | 8/1999 | Vogeley, Jr. et al. | |
| 5,944,598 A | 8/1999 | Tong et al. | |
| 6,104,827 A | 8/2000 | Benn et al. | |
| 6,974,373 B2 * | 12/2005 | Kriesel | 452/157 |
| 7,039,220 B2 * | 5/2006 | Kriesel | 382/110 |
| 7,110,572 B1 | 9/2006 | Benn | |
| 7,214,124 B2 * | 5/2007 | Kobayashi et al. | 451/57 |
| 7,399,220 B2 * | 7/2008 | Kriesel et al. | 452/157 |
| 7,853,046 B2 * | 12/2010 | Sharony | 382/110 |
| 7,918,718 B2 * | 4/2011 | Christensen et al. | 452/157 |

FOREIGN PATENT DOCUMENTS

| | | |
|---|---|---|
| DE | 100 50 836 A1 | 6/2002 |
| DE | 10 2004 017 037 A1 | 10/2004 |
| DE | 10 2006 007 490 A1 | 8/2006 |
| EP | 0 324 522 A1 | 7/1989 |
| EP | 0 848 308 A1 | 6/1998 |
| EP | 1 174 034 A1 | 1/2002 |
| GB | 2 364 894 A | 2/2002 |
| JP | 04-084850 | 3/1992 |
| JP | 06-242102 | 9/1994 |
| WO | WO 2004/106020 A1 | 12/2004 |
| WO | WO 2006/136814 A1 | 12/2006 |
| WO | WO 2006/136818 A1 | 12/2006 |

* cited by examiner

*Primary Examiner* — Richard Price, Jr.
(74) *Attorney, Agent, or Firm* — Kilpatrick Townsend & Stockton LLP

(57) ABSTRACT

The invention relates to a measuring device (18) for determining the thickness of a layer of fat of a meat product (12) comprising a premium cut part and a layer of fat, wherein the thickness of the layer of fat is determined in a contact-free manner. The invention also relates to a device for separating the layer of fat of a meat product from a premium cut part of a meat product by means of said type of measuring device, and to a method for determining the thickness of a layer of fat of a meat product and to a method for separating a layer of fat of a meat product.

20 Claims, 1 Drawing Sheet

FAT COVER MEASUREMENT DEVICE

CROSS-REFERENCES TO RELATED APPLICATIONS

Figure 1:
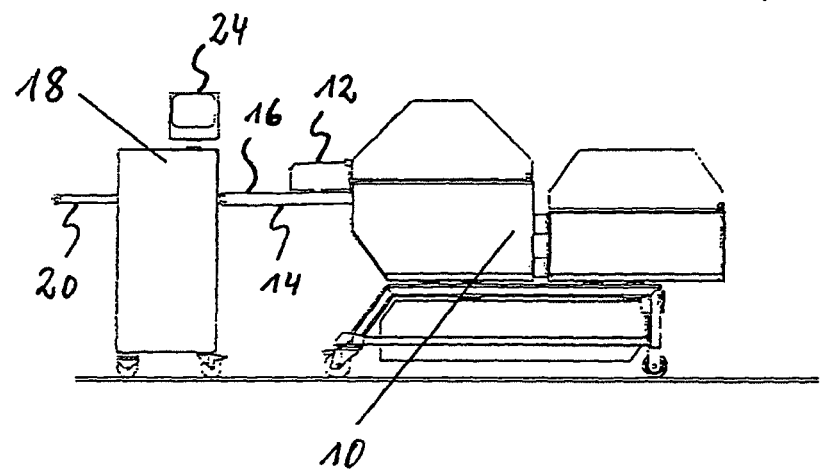

This application is a National Stage of International Application No. PCT/EP2008/007567 filed Sep. 12, 2008, and which claims the benefit of German Patent Application No. 10 2007 050 857.5, filed Oct. 24, 2007, the disclosures of which are incorporated herein by reference.

The invention relates to a measurement device for the determination of the thickness of a fat cover of a meat product comprising a flesh component and a fat cover.

Meat products essentially comprise three components, namely rind, fat and flesh. The pieces of meat to be processed are carved into these three components depending on demand in the meat processing industry.

To be able to separate the rind and the fat, i.e. the fat cover, from the flesh component of a meat product in an automated process, it is necessary to know the thickness of the fat cover, in other words its size or height. Known measurement devices provide a sensor for the determination of the thickness of a fat cover of a meat product which is inserted into the product and detects the environmental brightness during the insertion. A conclusion can be drawn on the consistency of the material pierced by the sensor or at least a change in the consistency can be detected by an evaluation of the different brightness values occurring during the insertion and detected by the sensor, from which ultimately the thickness of a fat cover can be determined.

It is disadvantageous in this connection that the meat product is damaged by the insertion of the sensor, in particular since the sensor has to be inserted at multiple sites of the product for a reliable determination of the thickness of the fat cover or a plurality of sensors arranged in a distributed manner have to be inserted into the product simultaneously.

It is the underlying object of the invention to provide a measurement device which allows a determination of the thickness of a fat cover of a meat product without damaging the meat product in so doing.

The object is satisfied by a measurement device having the features of claim 1 and in particular in that the determination of the thickness of the fat cover takes place in a non-contact manner.

The determination of the thickness of the fat cover advantageously takes place optically. The measurement device can for this purpose have a light detector for the detection of light reflected at the meat product. The light detector can include a camera, for example a CCD camera whose field of vision is preferably selected to be so large that a region of the meat product is detected which includes a boundary surface between the fat cover and the flesh component.

A conclusion can be drawn on the consistency of the detected product material with reference to the determined reflectivity of the regions of the meat product detected by the light detector so that a transition from one component to another component of the meat product can be recognized or even different components of the meat product and in particular the fat cover of the meat product can be identified from which ultimately the thickness of the fat cover can be determined.

To improve the detection result, a light source can be provided which illuminates a region of the meat product and in particular the region detected by the light detector. In accordance with a preferred embodiment, the light source includes at least one light emitting diode, in particular a light emitting diode emitting in the blue wavelength spectrum. Since the reflection properties of the fat component and of the flesh component of a meat product in particular differ considerably from one another in the blue wavelength spectrum, the use of blue light allows a particularly reliable determination of the fat cover thickness.

In accordance with a further embodiment, a transport device is provided to transport the meat product, in particular continuously, through the measurement device. In this way, the measurement of the meat product can easily be integrated into a process for the processing of the meat product. The transport device preferably includes a conveying means which is provided to supply the meat product to a cutting device for the separation of the fat cover from the flesh component.

The light detector and the light source are advantageously arranged laterally next to the transport device viewed in the transport direction.

A further subject of the invention is an apparatus for the separation of a fat cover of a meat product from a flesh component of the meat product having a measurement device for the automatic measurement of the fat cover, in particular a measurement device of the above-described kind, and having a cutting device coupled to the measurement device for the automatic separation of the fat cover from the flesh component in dependence on the measured data determined by the measurement device.

The coupling of the cutting device to the measurement device allows a completely automated separation of the fat cover from the flesh component of the meat product. In particular no manual measurement of the fat cover or manual adaptation of the cutting device to the measured fat cover thickness is required since both the determination of the fat cover thickness and the corresponding setting of the cutting device takes place automatically. This ultimately allows a separation of a fat cover from a flesh component of a meat product with a significantly lower economic effort.

If the determination of the fat cover thickness takes place in a non-contact manner, as described above, the fat cover can be separated from the flesh part without the fat cover and/or the flesh component being pierced, incised or damaged in any other manner.

A transport device is advantageously provided to transport the meat product, in particular continuously, through the measurement device and to supply it to the cutting device.

The cutting device can include a cutting blade, in particular a cutter bar, whose position, and in particular whose height, is variable relative to a product support. In this manner, the cutting device and in particular the cutting blade position can be adapted to differently thick fat covers or the thickness can be set with which the fat cover is separated from the flesh component.

The cutting device preferably has control unit for the control of the operation of the cutting blade in dependence on the measured data determined by the measurement device.

In addition, a travel profile can be stored in the control device in accordance with which the position, and in particular the height of the cutting blade, is to be set relative to a product support in dependence on a product feed. The travel profile makes it possible to take account so-to-say of the anatomy of the meat product on the separation of the fat cover from the flesh component and to follow the natural shape, that is the anatomically induced shape, of the fat cover.

A further subject of the invention is a method for the determination of the thickness of a fat cover of a meat product including a flesh component and a fat cover having the features of claim 13 by which the advantages already explained in connection with the measurement device in accordance with the invention can be realized correspondingly.

In accordance with a preferred embodiment of the method, only a part section of the meat product is measured for the determination of the thickness of the fat cover, in particular a front part section viewed in a transport direction. The measurement of a part section enables a sufficiently precise prediction on the shape of the fat cover over the total extent of the meat product in particular with such meat products in which the fat cover shape varies from product to product in a known manner or only slightly since the measured part section can be unambiguously associated with one of a plurality of known "anatomies" of the meat product. A cutting program can thus be selected in dependence on the measured result or on the associated "anatomy" by which the fat cover can be separated in the desired manner.

Alternatively or additionally, the shape of the fat cover can be determined by a measurement of the meat product at characteristic measurement points and a subsequent interpolation or extrapolation over the total meat product. This allows, on the one hand, a check whether the "anatomy" of the meat product was correctly determined from the measurement of a part section and, optionally, a modification of the cutting program. On the other hand, the fat cover shape over the total extent of the meat product can also be determined with those meat products in which experience has shown that the shape of the fat cover varies so much from product to product that the measurement in a part section is not sufficient for the precise determination of the fat cover shape.

In accordance with a further embodiment, the determined measured values are compared with measured values experience has shown are to be expected for the meat product and an error message is displayed on a deviation of the determined measured values from the measured values to be expected. In this way, unusual product deviations and/or miscuts can be detected and reported, whereby an incorrect processing of the product can be avoided, in particular with a fully automatic processing of the meat product.

If a camera system is used for the determination of the fat cover thickness, it cannot only be determined whether the meat product is located in a correct position for a further processing, but also whether a contamination of the camera objective is present by a corresponding evaluation of the taken camera images and in particular by a comparison of the taken camera images with statistical reference images. If the former or latter should be the case, a corresponding error message can be output and a processing of the meat product can optionally be stopped to avoid incorrect processing of the meat product.

A further object of the invention is furthermore a method for the separation of a fat cover of a mat product from a flesh component of the meat product having the features of claim 19 by which the advantages explained in connection with the separating apparatus can be achieved correspondingly.

Figure 2:
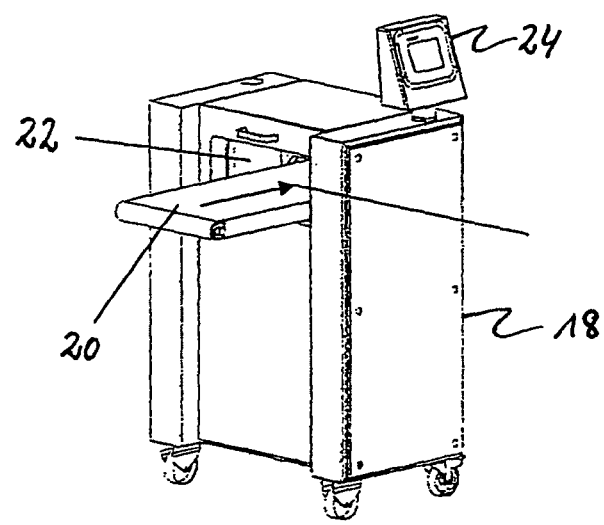

The invention will be described in the following purely by way of example with reference to an advantageous embodiment and to the enclosed drawing. There are shown:

FIG. 1 an apparatus in accordance with the invention for the separation of a fat cover of a meat product from a flesh component of the meat product with a measurement device and a cutting device; and FIG. 2 a perspective view of the measurement device of FIG. 1.

The apparatus shown in FIG. 1 includes a cutting device 10 for the separation of a fat cover from a flesh component of a meat product 12. Such a cutting device 10 is also called a derinding machine or a defatting machine.

The meat product 12 is supplied to the cutting device 10 by means of a transport device which has a first conveyor belt 14 for this purpose. An upper side 16 of the first conveyor belt 14 defines a support plane for the meat product 12.

The cutting device 10 includes, in a manner known per se, a cutter bar not shown in the Figure for the separation of the fat cover. The position of the knife bar relative to the first conveyor belt 14 and in particular the height of the cutter bar above the upper side 16 of the first conveyor belt 14 can be set in dependence on the thickness of the fat cover layer to be separated or on the thickness of the fat cover layer which should remain on the flesh component.

To enable a fully automatic defatting or derinding of the meat product 12, a measurement device 18 for the measurement of the meat product 12 is positioned in front of the cutting device 10 viewed in the transport or supply direction of the meat product 12.

The measurement of the meat product 12 takes place in a continuous running process while the meat product 12 moves through the measurement device 18. A second conveyor belt which is likewise part of the already named transport device and which adjoins the first conveyor belt 14 is provided for the transport of the meat product 12 through the measurement device 18.

The measurement of the meat product 12 is a contactless optical measurement. For this purpose an LED illuminator and a camera, for example a CCD camera, are provided behind a viewing window 22 arranged laterally next to the second conveyor belt 20.

The LED illuminator includes at least one light emitting diode emitting in the blue wavelength spectrum and is designed so that it illuminates a part region of the meat product 12 at least including the fat cover of the meat product 12. The use of blue light is particularly advantageous because the contrast between flesh and fat cover is particularly striking under blue light so that the course of the boundary between flesh and fat cover can be recognized particularly easily.

Images of the region of the meat product 12 illuminated by the LED illuminator are taken by means of the camera. The images taken are evaluated in an evaluation unit to determine the thickness of the fat cover, in other words that is the size of fat and rind.

In addition, it can be determined by a comparison of the taken images with statistical reference images stored in the evaluation unit whether the meat product 12 is located in a correct position for the processing in the cutting device 10, i.e. that it is correctly aligned, and/or whether a contamination of a camera objective and/or of the viewing window 22 is present.

On a detected misalignment of the meat product 12 or contamination of the viewing window 22, an optical and/or acoustic error message can be displayed via an output means 24 connected to the evaluation unit so that an operator of the apparatus can take corresponding measures to remedy the error or errors. Alternatively or additionally, the evaluation unit can in such a case also stop the second conveyor belt 20 and/or the first conveyor belt 14 to prevent an erroneous further processing of the meat product 12.

It is generally possible to measure the meat product 12 over its total length viewed in the transport direction. In view of the data quantities which arise in this process, it is, however, more favorable to measure a part section of the meat product 12, for example a front part section viewed in the transport direction.

Specifically, the measurement of the meat product 12 can, for example, take place such that a plurality of flashes, e.g. 10 to 20 flashes, are emitted by the LED illuminator shortly after one another at short time intervals of e.g. a few 10 ms, while the meat product 12 moves past the viewing window 22. A respective value for the thickness of the fat cover is determined from the camera images associated with the respective flashes and a mean value is calculated from these determined values which is considered as the actual value of the fat cover thickness in the detected region.

It is generally sufficient to carry out this measurement procedure once per meat product 12. If the measurement procedure is, however, carried out several time over a length of the meat product 12 of a plurality of centimeters, e.g. 10 to 15 cm, the actual thickness of the fat cover can be determined with a higher accuracy or an indication can already be obtained on the shape of the fat cover.

It can generally be assumed that the shape of the fat cover does not change significantly due to the anatomy of the meat product with similar meat products 12 so that it is sufficient, with knowledge of the anatomy of the meat product 12, to measure a part section of the meat product 12, e.g. to measure a front section in order to predict the shape of the fat cover and in particular its thickness over the total meat product 12. The measurement of the part region thus allows a clear determination of the shape of the fat cover.

The thickness of the fat cover determined in the part section by the measurement device 18 is transferred from the evaluation unit of the measurement device 18 to a control unit of the cutting device 10 which determines the anatomy of the meat product 12 from the measurement result.

Product-dependent or anatomy-dependent travel profiles are stored in the control unit of the cutting device 10 which effect a change in the setting of the cutter bar in dependence on the feed of the meat product 12 to be processed while taking account of the determined anatomy of the respective meat product 12 to be processed.

The control device selects a suitable travel profile with respect to the measured result of the determined anatomy of the meat product 12 and the height of the cutter bar is set by said travel profile in dependence on the thickness and on the shape of the fat cover and in dependence on the product feed so that a fat cover layer of a desired thickness is separated from the meat product 12 or so that a fat cover layer of a desired thickness remains at the flesh component of the meat product 12.

If meat products 12 are processed, which e.g. differ more from one another, it is also possible to determine the shape of the fat cover by a measurement of the meat product 12 at a plurality of characteristic measurement points which are in particular arranged distributed over the length of the meat product 12 and by a subsequent interpolation or extrapolation of the measured result over the total meat product 12.

The shape of the fat cover thus determined is in turn transferred from the evaluation unit of the measurement device 18 to the control unit of the cutting device 10 so that it can set the height of the cutter bar in dependence on the determined shape of the fat cover and in dependence on the product feed so that a fat cover layer of a desired thickness is separated from the meat product 12 or so that a fat cover layer of a desired thickness remains at the flesh component of the meat product 12.

Optionally, the measurement of the meat product 12 at a plurality of characteristic measurement points which are in particular arranged distributed over the length of the meat product 12 and the subsequent interpolation or extrapolation of the measured results over the total meat product 12 can be used not only instead of a stored travel profile, but also additionally to a stored travel profile, so-to-say in the form of a fine setting, to control the setting of the cutter bar.

As a result, the apparatus in accordance with the invention allows a fully automatic separation of a fat cover from a flesh component of a meat product 12, with an incorrect processing of the meat product 12 being avoided by the mentioned error recognition and thus the process security being increased and in addition a piercing or incision of the fat cover and/or of the flesh component being avoided by the contactless measurement of the meat product 12.

REFERENCE NUMERAL LIST

10 cutting device
12 meat product
14 first conveyor belt
16 upper side
18 measurement device
20 second conveyor belt
22 viewing window
24 output means

The invention claimed is:

1. An apparatus for separation of a fat cover of a meat product from a flesh component of the meat product, comprising:
   a measurement device for automatic determination of the thickness of the fat cover, wherein the determination of the thickness of the fat cover takes place in a contactless manner; and
   cutting device coupled to the measurement device for automatic separation of the fat cover from the flesh component in dependence on the thickness determined by the measurement device, wherein the cutting device comprises:
      a cutting blade whose position is variable relative to a product support; and
      a control unit for control of the position of the cutting blade in dependence on the thickness determined by the measurement device, wherein at least one travel profile is stored in the control unit in accordance with which the position of the cutting blade relative to the product support is to be set in dependence on a product feed.

2. The apparatus of claim 1, wherein the determination of the thickness of the fat cover takes place optically.

3. The apparatus of claim 1, further comprising a light detector for the detection of light reflected at the meat product.

4. The apparatus of claim 3, wherein the light detector comprises a camera.

5. The apparatus of claim 1, further comprising a light source configured to illuminate a region of the meat product.

6. The apparatus of claim 5, wherein the light source comprises at least one light emitting diode.

7. The apparatus of claim 6, wherein the light emitting diode is configured to emit light in the blue wavelength spectrum.

8. The apparatus of claim 1, further comprising a transport device configured to transport the meat product through the measurement device.

9. The apparatus of claim 8, further comprising a light source and a light detector disposed laterally next to the transport device when viewed in the transport direction.

10. The apparatus in accordance of claim 8, wherein the transport device further configured to supply the meat product to the cutting device.

11. The apparatus of claim 1, wherein the cutting blade is a cutter bar.

12. The apparatus of claim 1, wherein the position of the cutting blade comprises the height of the cutting blade relative to the product support, wherein the travel profile comprises instructions for the height of the cutting blade along a length of the meat product.

13. The apparatus of claim 1, wherein the position of the cutting blade is variable relative to the meat product.

14. A method for separation of a fat cover of a meat product from a flesh component of the meat product, comprising:
    determining the thickness of the fat cover in a contactless manner;
    setting a position of a cutting blade in dependence on the determined thickness of the fat cover in accordance with a preset travel profile and in dependence on a feed of the meat product, wherein the setting comprises setting the position in a direction transverse to the feed direction; and
    with the cutting blade, separating the fat cover from the flesh component, wherein during the separating, the cutting blade is at the set position according to the travel profile.

15. The method of claim 14, wherein determining the thickness of the fat cover comprises an optical measurement.

16. The method of claim 14, wherein determining the thickness of the fat cover takes place during a transport movement of the meat product.

17. The method of claim 14, wherein the meat product defines a length along the feed direction, the method further comprising determining the shape of the fat cover over the total length of the meat product at characteristic measurement points and by subsequent interpolation or extrapolation.

18. The method of claim 14, further comprising comparing the determined thickness with thickness values that are to be expected for the meat product, and displaying an error message when the determined thickness deviates from the thickness values that are to be expected.

19. The method of claim 14, wherein the meat product defines a length aligned in the feed direction,
    wherein determining the thickness comprises selecting only a part of the length of the meat product, and measuring the thickness of the fat cover only at the part of the length, and
    wherein setting the position of the cutting blade comprises selecting the preset travel profile only in dependence on the measured thickness taken only at the part of the length.

20. The method of claim 19, wherein the part of the length is a frontmost part in the feed direction.

* * * * *